United States Patent [19]
Ryberg

[11] 3,813,592
[45] May 28, 1974

[54] STEPPING MOTOR ACCELERATION AND DECELERATION CONTROL

[75] Inventor: Arlen W. Ryberg, Excelsior, Minn.

[73] Assignee: Honeywell Information Systems, Inc., Waltham, Mass.

[22] Filed: Aug. 12, 1971

[21] Appl. No.: 171,219

[52] U.S. Cl.................. 318/696, 318/685, 318/601
[51] Int. Cl. .......................................... G05b 19/40
[58] Field of Search .......... 318/696, 685, 600, 601, 318/603

[56] References Cited
UNITED STATES PATENTS

| | | | |
|---|---|---|---|
| 3,374,410 | 3/1968 | Cronquist et al. .............. | 318/685 X |
| 3,378,741 | 4/1968 | Sutton............................... | 318/603 |
| 3,414,786 | 12/1968 | Kasmer........................... | 318/685 X |
| 3,476,996 | 11/1969 | Fredriksen...................... | 318/696 X |
| 3,482,155 | 12/1969 | Fredriksen...................... | 318/685 X |
| 3,582,751 | 6/1971 | Rosshirt............................ | 318/696 |
| 3,586,953 | 6/1971 | Markkanen...................... | 318/603 |
| 3,609,315 | 9/1971 | Rogers.............................. | 318/603 |

Primary Examiner—G. R. Simmons
Attorney, Agent, or Firm—John S. Solakian; Ronald T. Reiling

[57] ABSTRACT

A digital computer is programmed to control the acceleration and deceleration of a stepping motor. A buffer is utilized to indicate the number of times the motor is to be stepped during a specified movement of the motor. A table is utilized to indicate selected periods of time between steps of the motor in order to achieve a selected rate of change of the motor's velocity. The number of the means for indicating, which number is indicative of the number of times the motor remains to be stepped, and the addressed location of the table are updated each time the motor is stepped. Repeated steps of the motor are made after waiting a period of time corresponding to the table location addressed. The motor accelerates, decelerates or rotates at a constant speed depending on the change or lack of change of the table location used.

27 Claims, 2 Drawing Figures

STEPPING MOTOR ACCELERATION AND DECELERATION CONTROL

BACKGROUND OF THE INVENTION

1. Field of the Invention

The present invention generally relates to stepping motor control systems and more particularly relates to a method for controlling the acceleration and deceleration of a stepping motor.

2. Prior Art

As is well known, a stepping motor is rotated in response to input signals or pulses. The motor rotates by an angle correspondingly proportional to the number of input pulses received by the motor and the speed of the motor is proportional to the frequency of the input pulses. In accordance with these characteristics, the stepping motors are utilized for numerical control of machine tools such as milling machines, etc.

In order to control movement of a tool relative to a workpiece, the stepping motor must rotate accurately in response to the input pulses. Since the stepping motor cannot reach high speed instantaneously, the input pulses must be supplied gradually by increasing the frequency thereof during a time period. Likewise since the stepping motor cannot stop instantaneously because of motor inertia, etc., the input pulses must be gradually decreased in frequency until the motor stops. If the input pulses are increased or decreased too rapidly, the stepping motor may respond erroneously and the proportional relationship between the number of input pulses and the angle or rotation of the motor may be destroyed.

Apparatus found in the prior art which presents solutions to the stepping motor acceleration and deceleration problems is described in U.S. Pat. Nos. 3,374,410; 3,479,279; and 3,582,751. Each of the systems described in these patents present special electronics in order to provide the control required. Associated with this special electronics is increased cost and volume as well as decreased reliability. In each of these systems, a particular motor's acceleration/deceleration requirements is not easily provided for.

It is therefore an object of the invention to provide a new and improved stepping motor control system.

It is a further object of the invention to provide a stepping motor control system which is easily adapted to a particular motor's acceleration or deceleration characteristics.

It is yet another object of the invention to provide an improved stepping motor control method which is reliable and which does not require the use of special electronics.

SUMMARY OF THE INVENTION

The purposes and objects of the invention are satisfied by providing a computer program for use in a system comprising a digital computer, a stepping motor and means for coupling the computer and motor. The computer further comprises a buffer or counter and a table, both of which may reside in the computer memory. The buffer includes items in a plurality of number positions for indicating the number of times the motor is to be stepped during a specified movement of a device and the table includes indexes in a plurality of numbered locations for indicating selected periods of time between steps of the motor to achieve a selected rate of change of the motor's velocity. The program includes instructions for processing by the computer to provide the method steps of effectively changing the buffer position addressed each time the motor is stepped, changing the addressed location of the table each time the motor is stepped, stepping the motor, and repeating the step of stepping the motor after waiting a period of time indicated by the table location addressed prior to the steps of stepping the motor. An improvement to this method includes the added steps of determining whether the number of items in the buffer is smaller than the number of the table location addressed, using for the waiting period the index in the table location addressed if the number in the buffer is equal to or greater than the number of table location addressed, and using for the waiting period the index in the table location which is numbered equally to the number of items in the buffer if the number of items in the buffer is smaller than the number of the table location addressed.

BRIEF DESCRIPTION OF THE DRAWINGS

The advantages of the foregoing configuration of the invention become more apparent upon reading the accompanying detailed description in conjunction with the figures in which.

DETAILED DESCRIPTION OF THE PREFERRED EMBODIMENTS

Figure 1:
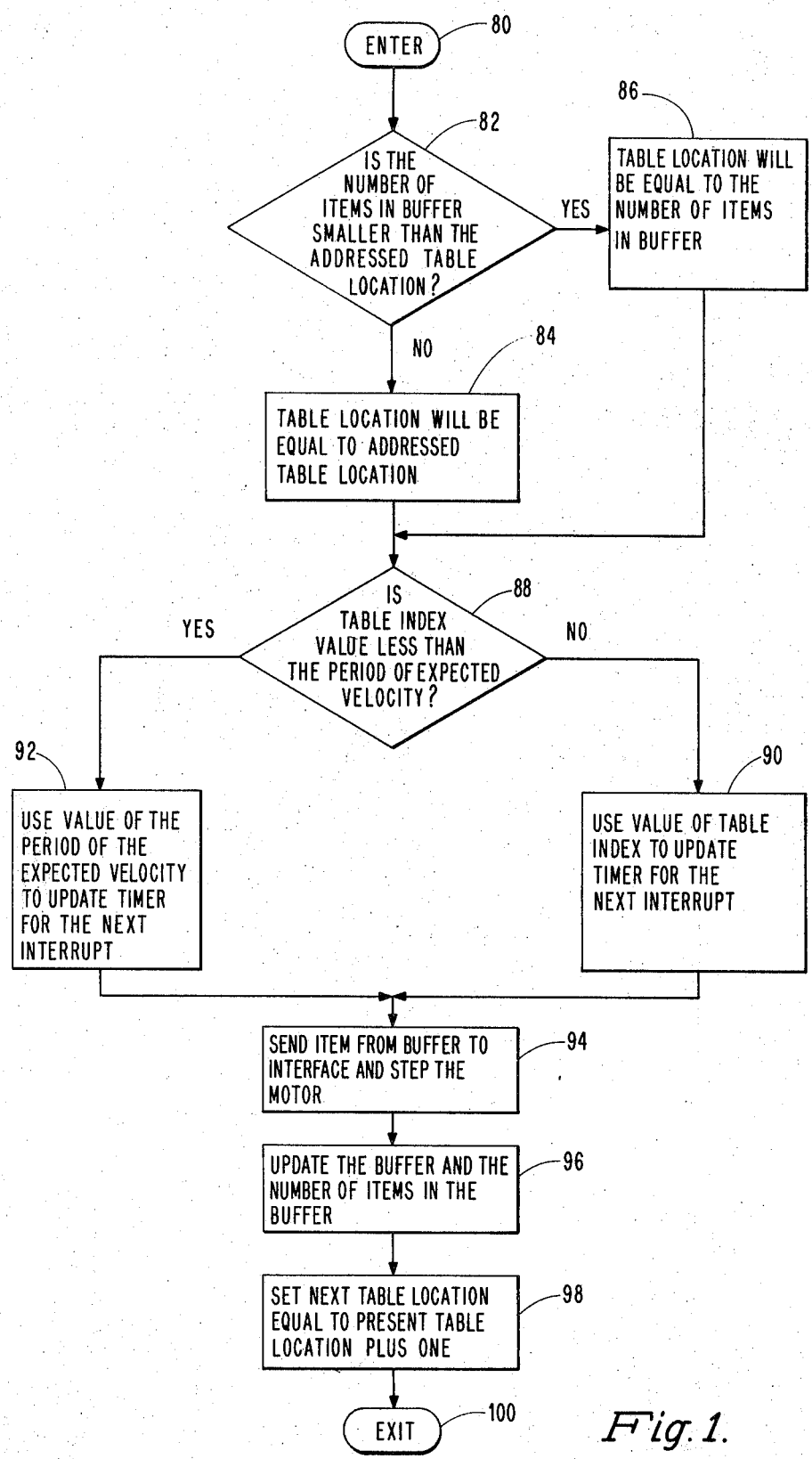
FIG. 1 is a flow diagram of the computer program of the invention.

FIG. 1 illustrates the functions which must be performed each time the stepping motor is rotated one step. The functions are repeatedly performed, once for each step, until the motor rotates as required and stops. In order to understand the flow diagrams, descriptions of the buffer and table are required. The buffer is used to indicate the number of times the motor is to be stepped during a specified movement of the motor. The motor may then control the movement of a device, for example with respect to a workpiece. Thus when controlling a single motor, the buffer will store a plurality of items, each item designating the single motor to be moved and its direction of rotation. In the following discussion the motor designated and its direction of rotation are constants. The number of positions in the buffer, i.e. the number of items stored in the buffer corresponds in number to the number of steps required to accelerate or decelerate the motor. The total number of steps for a specified movement, i.e., the total number of items may be greater in number than the number of positions in the buffer. In such a case, the items are continually supplied into the buffer under program control. As will be seen, once the buffer starts to empty beyond a given point, the motor will start to decelerate. Once the buffer is empty of further items, the motor will stop. The buffer may be a separate shift register or may be generated in a computer memory under program control.

The table may also be stored in the computer memory and includes a plurality of table indexes stored in a plurality of table locations. The number of locations corresponds in number to the number of steps required to accelerate or decelerate the motor as required. Thus the number of table index locations corresponds to the number of buffer positions. Each index in the table indicates the time, in computer clock counts, between successive items or for a single motor between successive steps of the motor. The table is comprised of successively increased numbered locations and may be set in accordance with an acceleration curve with a correspondingly decreasing time between steps for each index. It will be seen that in one embodiment while the motor is accelerating the number of the addressed items in the buffer corresponds to the number of the addressed index in the table. Once the motor reaches a uniform speed the correspondence between the used or addressed numbers ceases.

Usually, when the motor is to accelerate, the number of items in the buffer is greater than or equal to the addressed table location. The motor will decelerate when the number of items in the buffer is less than the addressed table location. This statement is best supported by referring to a specific example as discussed with reference to FIGS. 1 and 2. By way of example, assume that the motor is to move 15 steps in one direction in order to complete a specified movement. Let us also assume that the maximum stepping rate of the motor is 1,000 steps per second and that the number of steps required to move the motor from rest to the maximum stepping rate while maintaining synchronism between the motor position and stepping signals applied thereto is seven steps. Thus the table includes seven index locations having index values which may be indicated for example in Table 1 as follows.

TABLE 1

| Table Location | Index Value (Time between motor steps in counts) |
|---|---|
| 1 | 100 |
| 2 | 60 |
| 3 | 40 |
| 4 | 25 |
| 5 | 18 |
| 6 | 13 |
| 7 | 10 |

The buffer correspondingly has seven positions all indicating that the single motor be stepped in the same direction. The buffer is initially loaded with seven items and the remaining items are supplied under program control in response to an interrupt condition. The number of items in the buffer is constantly indicated as is the number of the table location addressed.

Figure 2:
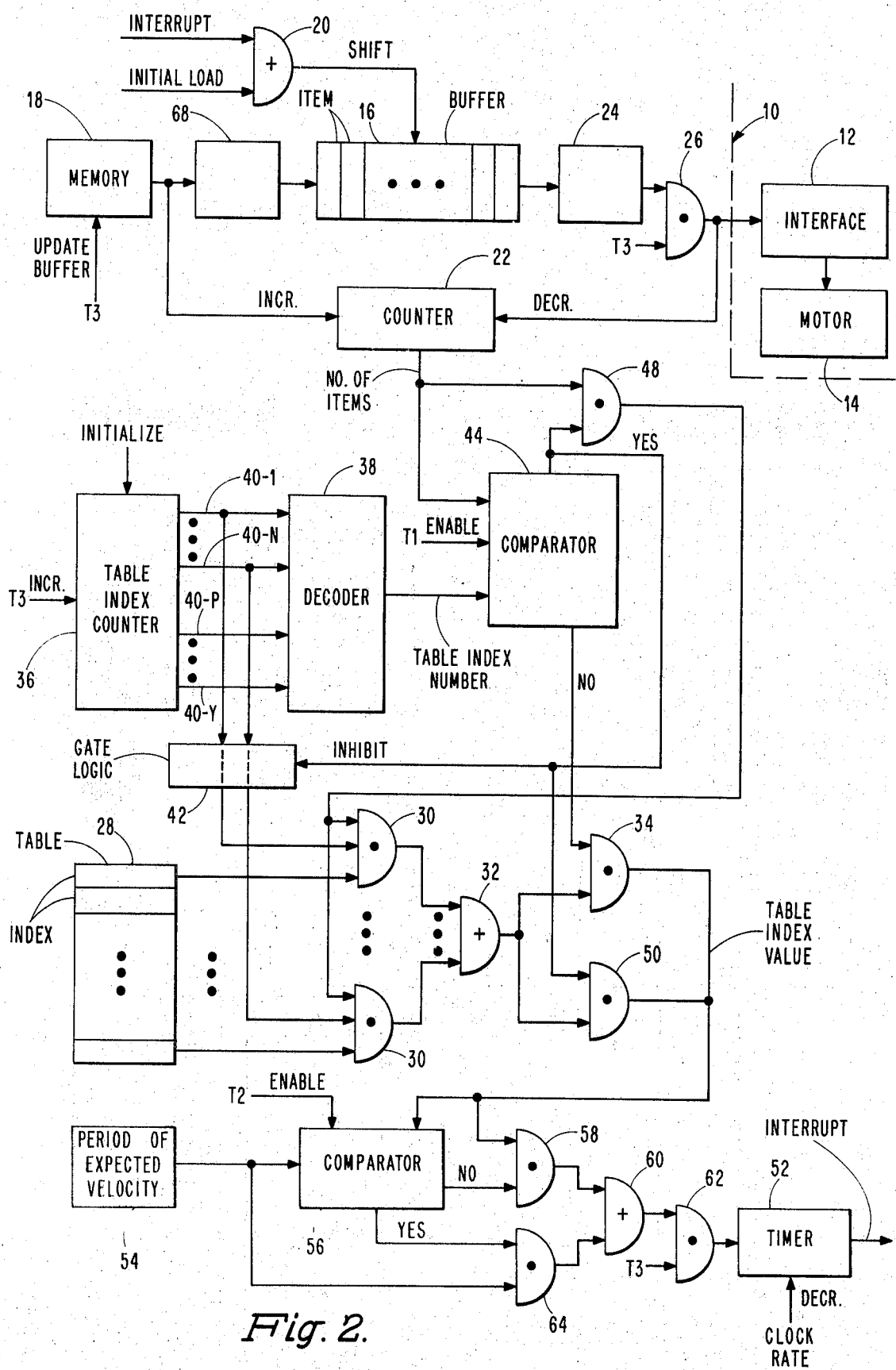
FIG. 2 is a block diagram of one embodiment of the apparatus usable in conjunction with the program of the invention.

In FIG. 2 a general purpose digital computer 10 is shown to include all elements except the interface 12 and motor 14. Preferably each of the elements shown may be programmed functions of the computer 10. In the alternative, the elements may be special purpose hardware. Buffer 16 is coupled to receive items from memory 18. Buffer 16 is shown to be of the shift register type so that the items are shifted into the positions of the buffer. Initially, an INITIAL LOAD signal via OR gate 20 may completely fill the buffer, although it is possible for a specified movement of the motor to have less steps than the number of steps required to achieve maximum velocity of the motor. Additional items are shifted into the buffer 16 in response to the INTERRUPT signal. Each time an item is shifted into buffer 16, counter 22 is incremented. Each time an item is shifted out of the buffer, counter 22 is decremented. This keeps track of the items in the buffer. The last position or output of buffer 16 is coupled to buffer 24 so that buffer 24 and the last position of buffer 16 indicate the same item. Buffer 24 is coupled to interface 12 by means of AND gate 26. Interface 12 is then coupled to motor 14. Motor 14 may be by way of example a stepping motor available from Superior Electric Company under the name SLO-SYN motor. Interface 12 may be that interface available from the same company under the name SLO-SYN Series HTR400 pulse to pulse motor translator.

Table 28, which may be included in memory 18, includes a plurality of locations for storage of a corresponding number of indexes as shown by Table 1. The value of each index is coupled by means of AND gates 30, one gate effectively for each index direction. The AND gates 30 are each coupled through OR gate 32 and AND gate 34. The output of gate 34 will be the Table Index Value.

The number of table location addressed (table Index Number) is available by means of table index counter 36 and decoder 38. At the beginning of a specified movement of the motor, counter 36 is initialized under program control to indicate the first location of the table. The counter 36 is then incremented each time the motor steps. Counter 36 counts beyond the number of locations in table 28 as is shown by the added counter output lines 40 - P to 40 - Y. The other output lines 40 - 1 to 40 - N correspond in number to the number of locations in table 28 and are used to enable gates 30 by means of gate logic 42. Gate logic 42 which may include simple AND gates is utilized to prevent signals on lines 40 from reaching gates 30 when comparator 44 produces a YES result.

Comparator 44 is used to determine whether the Number of Items in the buffer 16 is smaller than the Table Index Number (the addressed table location) at the output of decoder 38, thereby providing either a YES or NO result whichever is the case. This decision is shown in block 82 of the flow diagram of FIG. 1 which is entered via block 80, once for each step of the motor. If the answer is NO, gate 34 is enabled to pass the addressed table location depending upon which gate 30 was enabled by counter 36. See block 84 of FIG. 1. If the answer is YES, gate logic 42 is inhibited, AND gate 50 is enabled, and gate 48 is enabled to pass the Number of Items from counter 22 to enable one of the gates 30 to pass the index from the location in table 28 corresponding to the Number of Items through gate 32 and gate 50 thereby indicating the Table Index Value. See block 86 of FIG. 1.

The Table Index Value may in one embodiment be received directly by timer 52 which is preset by the Table Index Value and counts down at the clock rate for the number of counts by the Table Index Value until an INTERRUPT signal is generated. As stated before, the INTERRUPT signal via gate 20 shifts another item into buffer 16 if another item is available thereby moving each item over one position or simply shifts the items presently contained in buffer 16. A further refinement makes it desirable to establish an expected velocity whose period may be stored in a register 54 which may be part of memory 18. The expected velocity is that the velocity at which the motor should rotate and is especially useful when the expected velocity is less than the maximum velocity attainable by the motor. That is, in some case it may be desirable to rotate the motor at a velocity less than its maximum velocity. The period of the expected velocity in counts is compared with the Table Index Value via comparator 56. See block 88 of FIG. 1.

If the Table Index Value is less than the period of the expected velocity, comparator 56 will produce a NO result enabling AND gate 58 to pass the Table Index Value via OR gate 60 and AND gate 62 to timer 52. See block 90 of FIG. 1. If the comparator 56 produces a YES result, AND gate 64 is enabled to pass the period of the expected velocity also via gates 60 and 62 to timer 52. See block 92 of FIG. 1.

The operations indicated above are produced in sequence by means of timing signals T1, T2 and T3. At time T1, a compare is made (block 82 of FIG. 1) by means of comparator 44 which is enabled in response thereto. At time T2, a compare is made (block 88 of FIG. 1) by means of comparator 56 which is enabled in response thereto. At time T3, the item in buffer 24 is passed to interface 12 via gates 26 and the motor 14 is stepped. See block 94 of FIG. 1. Also at time T3, and via gate 62, the timer is preset or updated by either the Table Index Value (see block 90 of FIG. 1) or the period of the expected velocity (see block 92 of FIG. 1). Further, and also at time T3, the Number of Items effectively in the buffer 16 is updated and the buffer 68 is loaded with the next item from memory 18. See block 96 of FIG. 1. Note that buffer 68 is used to have the next item available to buffer 16 immediately upon receipt of the INTERRUPT signal. Timing signal T3 is utilized to also update the table location addressed by incrementing counter 36. See block 98 of FIG. 1. Note that each of the functions produced in response to T3, do not necessarily have to occur at the same time. An example sequence is shown by the arrangement of blocks in the flow diagram of FIG. 1. After this timing sequence the program exits (block 100 of FIG. 1) and does not enter again until an INTERRUPT signal is produced or an interrupt is produced under program control, for example by means of automatic shut off procedures in case of malfunction.

The specific examples previously indicated, i.e., 15 steps and the index value of the table as shown in Table 1 with the period of expected velocity equal to 12 counts will now be discussed with reference to Table 2.

TABLE 2

| Step No. | No. of items in buffer | Table location addressed | Result block 82 of Fig. 1 | Table location used | Result block 88 of Fig. 1 | Timer preset by (counts) |
|---|---|---|---|---|---|---|
| 1 | 7 | 1 | No | 1 | No | 100 |
| 2 | 7 | 2 | No | 2 | No | 60 |
| 3 | 7 | 3 | No | 3 | No | 40 |
| 4 | 7 | 4 | No | 4 | No | 25 |
| 5 | 7 | 5 | No | 5 | No | 18 |
| 6 | 7 | 6 | No | 6 | No | 13 |
| 7 | 7 | 7 | No | 7 | Yes | 12 |
| 8 | 7 | 8 | Yes | 7 | Yes | 12 |
| 9 | 7 | 9 | Yes | 7 | Yes | 12 |
| 10 | 6 | 10 | Yes | 6 | No | 13 |
| 11 | 5 | 11 | Yes | 5 | No | 18 |
| 12 | 4 | 12 | Yes | 4 | No | 25 |
| 13 | 3 | 13 | Yes | 3 | No | 40 |
| 14 | 2 | 14 | Yes | 2 | No | 60 |
| 15 | 1 | 15 | Yes | 1 | No | 100 |
|  | 0 | Stop |  |  |  |  |

Table 1 is shown as an acceleration table, i.e. the number of counts between steps decreases as the table location increases in number. Thus a NO result for comparator 44 indicates acceleration of the motor, whereas a YES result indicates either deceleration or constant speed of the motor. As shown by the state diagram of Table 2, after the first step is made, a time period corresponding to one numbered counts elapses before the second step. Also, the Number of Items in the buffer is initially seven and will remain at seven for eight additional steps since the specified movement is 15 steps. Note that the motor accelerates in accordance with the values of the table until the seventh step is reached. During processing of the seventh step, the period of the expected velocity is greater than the table value, therefore the period of the expected velocity, 12 counts, is used. The motor remains at a constant speed for three steps and then starts to decelerate after the tenth step until the motor takes its fifteenth step, waits 100 counts and stops further stepping of the motor as indicated by the zero value of the Number of Items in the buffer.

Thus it has been seen that the acceleration and deceleration of the motor have been controlled by use of a single table which may reside in the computer's memory and which table includes the time between steps of the motor to achieve the desired acceleration or deceleration curve. Note that the curve generated for the table may be for the worst case of either acceleration of deceleration. It also has been shown that such time periods or indexes are easily changed in order to produce the acceleration/deceleration curve for a particular motor. All that needs to be done is to change the value of values of the indexes in the table. It also has been shown that the motor may rotate at the maximum velocity specified for the motor or may be set to rotate at an expected velocity which is smaller than the meximum velocity. It is also significant that the program need not know where the motor is in order to stop since all that is required is that the motor receive a given number of steps for the specified movement. Also, to stop the motor all that need be done is to stop putting items into the buffer so that when the buffer empties, the motor will stop automatically.

Buffer 16 has been shown to receive items from memory 18. If only a single motor is to be controlled for one direction of rotation, it can be seen that only a simple counter need be utilized to effectively replace buffer 16 and counter 22. The simple counter replacement need only be preset to the total number of steps required for the single motor. By the example this was 15 steps. Each time the motor is stepped, the counter would be decremented by one by the INTERRUPT SIGNAL, thereby giving the necessary indication of the Number of Items to comparator 44. The interface 12 would receive a command to step the motor 14 each time the timing signal T3 was received.

The number of locations in table 28 was said to be determined by the number of steps required to achieve the required acceleration/deceleration curve. The following indicates an example of calculations made to determine the number of steps. The following example will be used to illustrate the calculations. Assume that the maximum velocity of the motor is 1,000 steps per second, call this $V_{max}$, and that the maximum velocity at which the motor can rotate before changing the direction of rotation is 100 steps per second, call this $V_{min}$. Assume that the clock rate for decrementing timer 52 is 10,000 counts per second. This means that there would be 10 counts between every step of the motor when rotating at the maximum velocity and 100 counts between every step of the motor when rotating at the velocity of 100 steps per second. Note that the clock rate should be fast enough to give a sufficiently fine resolution in the velocity of the motor. Clock rates of 40,000 to 50,000 counts per second have been utilized to provide very smooth acceleration up to 2,000 to 3,000 steps per second.

Using equations of uniformly accelerated motion, then an acceleration value may be calculated by using the following formula:

$$A = (V_T - V_o)/t \quad \text{(Eq. No. 1)}$$

where $V_T$ is the final velocity, $V_o$ is the present or initial velocity, $t$ is the time of acceleration and $A$ is the acceleration value. Using the values of $V_{min}$ for rotation in the two directions, then:

$$A = \frac{100 \text{ steps/sec} - (-100 \text{ steps/sec})}{0.01 \text{ seconds (i.e. 100 counts)}}$$

$$A = 20,000 \text{ steps/sec/sec}$$

The total time, $t$, to go from a static position to a maximum velocity would then be:

$$t = (V_T - V_o)/A$$

$$t = (1,000 \text{ steps/sec} - 0)/(20,000 \text{ steps/sec/sec})$$

$t = 0.05$ seconds or 500 counts based on a clock rate of 10,000 counts/sec.

The number of locations in the table as well as the number of positions in the buffer are equal to the number of steps, $S$, required to accelerate the motor to the maximum velocity and is determined in accordance with the equation:

$S = V_o t + \frac{1}{2} A t^2$
$S = \frac{1}{2} A t^2$ where $V_o = 0$
$S = \frac{1}{2}(20,000 \text{ steps/sec/sec})(0.05 \text{ sec})^2$
$S = 25$ steps. (Eq. No. 2)

Using Equation No. 2, the values in counts of the indexes in the table may be calculated and for the above example have been found to be as shown in Table 3.

TABLE 3

| Table Location | Index Value (Counts) |
| --- | --- |
| 1 | 100 |
| 2 | 41 |
| 3 | 32 |
| 4 | 27 |
| 5 | 23 |
| 6 | 21 |
| 7 | 20 |
| 8 | 18 |
| 9 | 17 |
| 10 | 16 |
| 11 | 16 |
| 12 | 15 |
| 13 | 14 |
| 14 | 13 |
| 15 | 13 |
| 16 | 13 |

TABLE 3 — Continued

| | |
| --- | --- |
| 17 | 12 |
| 18 | 12 |
| 19 | 12 |
| 20 | 11 |
| 21 | 11 |
| 22 | 11 |
| 23 | 10 |
| 24 | 11 |
| 25 | 10 |

Heretofore the discussion has centered on the control of the one motor rotating in one direction. The teachings of the invention may be employed to control a plurality of motors. For example, assume we are controlling two motors A and B. The items in buffer 16 may appear as shown in Table 4.

TABLE 4

| Buffer Position | Item | | | |
| --- | --- | --- | --- | --- |
| | Step A | Dir. A | Step B | Dir. B |
| 1 | YES | + | YES | − |
| 2 | YES | + | NO | |
| 3 | YES | + | NO | |
| 4 | YES | + | YES | − |
| 5 | YES | + | No | |
| 6 | YES | + | NO | |
| 7 | YES | + | YES | − |
| 8 | YES | + | NO | |
| 9 | YES | + | NO | |
| 10 | YES | + | YES | − |

Thus Table 4 indicates that motor B is stepping once for every three steps in motor A. Also motor A is rotating in a plus or clockwise direction and motor B is rotating in a minus or counterclockwise direction.

The table 28 would then include indexes of the time between buffer items. If table 28 appears as follows in Table 5 then after motors A and B are stepped, 100 counts elapse before motor A is again stepped. A total of 270 counts elapses before motor B is again stepped, etc.

TABLE 5

| Table Location | Index Value (Counts) |
| --- | --- |
| 1 | 100 |
| 2 | 90 |
| 3 | 80 |
| 4 | 70 |
| 5 | 60 |
| 6 | 50 |
| 7 | 40 |
| 8 | 30 |
| 9 | 20 |
| 10 | 10 |

With two motors, there are now two interfaces similar to interface 12. The period of the expected velocity may be the same for both motors or may be set with regard to a particular motor and gated to produce the INTERRUPT signal accordingly.

The digital computer 10 may be any general purpose digital computer and by way of example may be the Honeywell H316 or DDP-516 general purpose computers.

Various modifications of this invention will be apparent to those skilled in the art from the above description of illustrative embodiments of this invention. The appended claims are intended to cover such modifications as are encompassed by the scope and spirit of this invention.

The following is a printout of a program of one embodiment of the invention and is included to further explain and illustrate the invention. This printout is written in an assembly language known as Honeywell DAP-16 Assembly Language and was used with a Honeywell H316 computer. The DAP-16 Assembly Language is described in a Honeywell publication entitled "DDP-116/416/516/H316 DAP-16 and DAP-16 Mod 2 Assembly Language, Assembler Manual", Document No. 70130072442A, Order No. M-1756, dated August, 1970. The Honeywell DAP-16 Mod 2 Assembler may be utilized to implement the following listings into machine language.

```
                        * ACCELERATION TABLE
                        * A=.1G, UNT=1000.
                        *
0289         000203     ACCT  EQU   *
0290  00203  000000           OCT   0
0291  00204  177340           DEC   -288         1.
0292  00205  177611           DEC   -119         2.
0293  00206  177645           DEC   -91          3.
0294  00207  177662           DEC   -78          4.
0295  00210  177675           DEC   -67          5.
0296  00211  177702           DEC   -62          6.
0297  00212  177710           DEC   -56          7.
0298  00213  177713           DEC   -53          8.
0299  00214  177717           DEC   -49          9.
0300  00215  177721           DEC   -47         10.
0301  00216  177724           DEC   -44         11.
0302  00217  177725           DEC   -43         12.
0303  00220  177727           DEC   -41         13.
0304  00221  177731           DEC   -39         14.
0305  00222  177732           DEC   -38         15.
0306  00223  177734           DEC   -36         16.
0307  00224  177734           DEC   -36         17.
0308  00225  177736           DEC   -34         18.
0309  00226  177737           DEC   -33         19.
0310  00227  177737           DEC   -33         20.
0311  00230  177740           DEC   -32         21.
0312  00231  177741           DEC   -31         22.
0313  00232  177742           DEC   -30         23.
0314  00233  177742           DEC   -30         24.
0315  00234  177743           DEC   -29         25.
0316  00235  177744           DEC   -28         26.
0317  00236  177744           DEC   -28         27.
0318  00237  177744           DEC   -28         28.
0319  00240  177745           DEC   -27         29.
0320  00241  177746           DEC   -26         30.
0321  00242  177746           DEC   -26         31.
0322  00243  177746           DEC   -26         32.
0323  00244  177747           DEC   -25         33.
0324  00245  177747           DEC   -25         34.
0325  00246  177747           DEC   -25         35.
0326  00247  177750           DEC   -24         36.
0327  00250  177751           DEC   -23         37.
0328  00251  177750           DEC   -24         38.
0329  00252  177751           DEC   -23         39.
0330  00253  177751           DEC   -23         40.
0331  00254  177751           DEC   -23         41.
0332  00255  177752           DEC   -22         42.
0333  00256  177752           DEC   -22         43.
0334  00257  177752           DEC   -22         44.
0335  00260  177753           DEC   -21         45.
```

| | | | | | |
|---|---|---|---|---|---|
| 0336 | 00261 | 177752 | DEC | -22 | 46. |
| 0337 | 00262 | 177753 | DEC | -21 | 47. |
| 0338 | 00263 | 177753 | DEC | -21 | 48. |
| 0339 | 00264 | 177754 | DEC | -20 | 49. |
| 0340 | 00265 | 177753 | DEC | -21 | 50. |
| 0341 | 00266 | 177754 | DEC | -20 | 51. |
| 0342 | 00267 | 177754 | DEC | -20 | 52. |
| 0343 | 00270 | 177754 | DEC | -20 | 53. |
| 0344 | 00271 | 177754 | DEC | -20 | 54. |
| 0345 | 00272 | 177755 | DEC | -19 | 55. |
| 0346 | 00273 | 177754 | DEC | -20 | 56. |
| 0347 | 00274 | 177755 | DEC | -19 | 57. |
| 0348 | 00275 | 177755 | DEC | -19 | 58. |
| 0349 | 00276 | 177756 | DEC | -18 | 59. |
| 0350 | 00277 | 177755 | DEC | -19 | 60. |
| 0351 | 00300 | 177755 | DEC | -19 | 61. |
| 0352 | 00301 | 177756 | DEC | -18 | 62. |
| 0353 | 00302 | 177756 | DEC | -18 | 63. |
| 0354 | 00303 | 177756 | DEC | -18 | 64. |
| 0355 | 00304 | 177756 | DEC | -18 | 65. |
| 0356 | 00305 | 177756 | DEC | -18 | 66. |
| 0357 | 00306 | 177756 | DEC | -18 | 67. |
| 0358 | 00307 | 177757 | DEC | -17 | 68. |
| 0359 | 00310 | 177757 | DEC | -17 | 69. |
| 0360 | 00311 | 177756 | DEC | -18 | 70. |
| 0361 | 00312 | 177757 | DEC | -17 | 71. |
| 0362 | 00313 | 177757 | DEC | -17 | 72. |
| 0363 | 00314 | 177757 | DEC | -17 | 73. |
| 0364 | 00315 | 177757 | DEC | -17 | 74. |
| 0365 | 00316 | 177760 | DEC | -16 | 75. |
| 0366 | 00317 | 177757 | DEC | -17 | 76. |
| 0367 | 00320 | 177760 | DEC | -16 | 77. |
| 0368 | 00321 | 177757 | DEC | -17 | 78. |
| 0369 | 00322 | 177760 | DEC | -16 | 79. |
| 0370 | 00323 | 177760 | DEC | -16 | 80. |
| 0371 | 00324 | 177760 | DEC | -16 | 81. |
| 0372 | 00325 | 177760 | DEC | -16 | 82. |
| 0373 | 00326 | 177760 | DEC | -16 | 83. |
| 0374 | 00327 | 177760 | DEC | -16 | 84. |
| 0375 | 00330 | 177761 | DEC | -15 | 85. |
| 0376 | 00331 | 177760 | DEC | -16 | 86. |
| 0377 | 00332 | 177761 | DEC | -15 | 87. |
| 0378 | 00333 | 177760 | DEC | -16 | 88. |
| 0379 | 00334 | 177761 | DEC | -15 | 89. |
| 0380 | 00335 | 177761 | DEC | -15 | 90. |
| 0381 | 00336 | 177761 | DEC | -15 | 91. |
| 0382 | 00337 | 177761 | DEC | -15 | 92. |
| 0383 | 00340 | 177761 | DEC | -15 | 93. |
| 0384 | 00341 | 177761 | DEC | -15 | 94. |
| 0385 | 00342 | 177761 | DEC | -15 | 95. |
| 0386 | 00343 | 177761 | DEC | -15 | 96. |
| 0387 | 00344 | 177762 | DEC | -14 | 97. |
| 0388 | 00345 | 177761 | DEC | -15 | 98. |
| 0389 | 00346 | 177762 | DEC | -14 | 99. |
| 0390 | 00347 | 177761 | DEC | -15 | 100. |
| 0391 | 00350 | 177762 | DEC | -14 | 101. |
| 0392 | 00351 | 177762 | DEC | -14 | 102. |
| 0393 | 00352 | 177761 | DEC | -15 | 103. |

| | | | | | |
|---|---|---|---|---|---|
| 0394 | 00353 | 177762 | DEC | -14 | 104. |
| 0395 | 00354 | 177762 | DEC | -14 | 105. |
| 0396 | 00355 | 177762 | DEC | -14 | 106. |
| 0397 | 00356 | 177762 | DEC | -14 | 107. |
| 0398 | 00357 | 177762 | DEC | -14 | 108. |
| 0399 | 00360 | 177763 | DEC | -13 | 109. |
| 0400 | 00361 | 177762 | DEC | -14 | 110. |
| 0401 | 00362 | 177762 | DEC | -14 | 111. |
| 0402 | 00363 | 177762 | DEC | -14 | 112. |
| 0403 | 00364 | 177763 | DEC | -13 | 113. |
| 0404 | 00365 | 177762 | DEC | -14 | 114. |
| 0405 | 00366 | 177763 | DEC | -13 | 115. |
| 0406 | 00367 | 177763 | DEC | -13 | 116. |
| 0407 | 00370 | 177762 | DEC | -14 | 117. |
| 0408 | 00371 | 177763 | DEC | -13 | 118. |
| 0409 | 00372 | 177763 | DEC | -13 | 119. |
| 0410 | 00373 | 177763 | DEC | -13 | 120. |
| 0411 | 00374 | 177762 | DEC | -14 | 121. |
| 0412 | 00375 | 177763 | DEC | -13 | 122. |
| 0413 | 00376 | 177763 | DEC | -13 | 123. |
| 0414 | 00377 | 177763 | DEC | -13 | 124. |
| 0415 | 00400 | 177764 | DEC | -12 | 125. |
| 0416 | 00401 | 177763 | DEC | -13 | 126. |
| 0417 | 00402 | 177763 | DEC | -13 | 127. |
| 0418 | 00403 | 177763 | DEC | -13 | 128. |
| 0419 | 00404 | 177763 | DEC | -13 | 129. |
| 0420 | 00405 | 177764 | DEC | -12 | 130. |
| 0421 | 00406 | 177763 | DEC | -13 | 131. |
| 0422 | 00407 | 177764 | DEC | -12 | 132. |
| 0423 | 00410 | 177763 | DEC | -13 | 133. |
| 0424 | 00411 | 177764 | DEC | -12 | 134. |
| 0425 | 00412 | 177763 | DEC | -13 | 135. |
| 0426 | 00413 | 177764 | DEC | -12 | 136. |
| 0427 | 00414 | 177764 | DEC | -12 | 137. |
| 0428 | 00415 | 177763 | DEC | -13 | 138. |
| 0429 | 00416 | 177764 | DEC | -12 | 139. |
| 0430 | 00417 | 177764 | DEC | -12 | 140. |
| 0431 | 00420 | 177764 | DEC | -12 | 141. |
| 0432 | 00421 | 177764 | DEC | -12 | 142. |
| 0433 | 00422 | 177764 | DEC | -12 | 143. |
| 0434 | 00423 | 177764 | DEC | -12 | 144. |
| 0435 | 00424 | 177764 | DEC | -12 | 145. |
| 0436 | 00425 | 177764 | DEC | -12 | 146. |
| 0437 | 00426 | 177764 | DEC | -12 | 147. |
| 0438 | 00427 | 177764 | DEC | -12 | 148. |
| 0439 | 00430 | 177764 | DEC | -12 | 149. |
| 0440 | 00431 | 177764 | DEC | -12 | 150. |
| 0441 | 00432 | 177764 | DEC | -12 | 151. |
| 0442 | 00433 | 177764 | DEC | -12 | 152. |
| 0443 | 00434 | 177764 | DEC | -12 | 153. |
| 0444 | 00435 | 177764 | DEC | -12 | 154. |
| 0445 | 00436 | 177764 | DEC | -12 | 155. |
| 0446 | 00437 | 177764 | DEC | -12 | 156. |
| 0447 | 00440 | 177764 | DEC | -12 | 157. |
| 0448 | 00441 | 177764 | DEC | -12 | 158. |
| 0449 | 00442 | 177764 | DEC | -12 | 159. |
| 0450 | 00443 | 177764 | DEC | -12 | 160. |

```
2266  04622   0 02 04272   LDA   PBC+M1
2267  04623   0 11 04270   CAS   PACC+M1
2268  04624   0 02 04270   LDA   PACC+M1                  MIN(PBC,PACC)
2269  04625   101000       NOP
2270  04626   0 04 00000   STA   0                        INDEX TO ACCEL TABLE
2271  04627   141206       AOA
2272  04630   0 04 04270   STA   PACC+M1                  FOR NEXT TIME IF SPEEDING UP
2273  04631   0 04 04271   STA   CREQ+M1                  REQUEST CONTROL MACH 1 (UNLESS PB FULLC)
2274                       *
2275  04632   1 02 00443   LDA   ACCT+PBL+1
2276  04633   0 11 04267   CAS   TSET+M1
2277  04634   0 02 04267   LDA   TSET+M1                  MIN(ACC,TSET)
2278  04635   101000       NOP
2279  04636   0 04 04266   STA   TIMR+M1                  RESET TIMER
```

I Claim:

1. In a system comprising a digital computer, a stepping motor, means for coupling said motor and said computer, wherein said computer comprises means for indicating the number of times said motor is to be directed to step during a specified movement and a table stored in said computer, said table having a plurality of numbered locations for indicating selected periods of time between steps of said motor to achieve a selected rate of change of said motor's velocity, a method comprising the steps of:
   A. changing the number of said means for indicating each time said motor is directed to step, said number corresponding to the number of times said motor is to be directed to step;
   B. changing the addressed location of said table each time said motor is directed to step;
   C. directing the stepping of said motor; and
   D. repeating said step of directing the stepping of said motor after waiting a period of time indicated by the table location addressed.

2. A method as defined in claim 1 wherein said period of time is indicated by the table location addressed prior to the step of directing the stepping of said motor.

3. A method as defined in claim 1 comprising the further steps of:
   A. determining whether said motor is to be accelerated; and
   B. using for said waiting period the period of time indicated by the table location addressed prior to the step of directing the stepping of said motor if said motor is to be accelerated.

4. A method as defined in claim 1 comprising the further steps of:
   A. Determining whether said motor is to be decelerated; and
   B. using for said waiting period the period of time indicated by the table location which corresponds in number to the number in said means for indicating if said motor is to be decelerated.

5. A method as defined in claim 1 comprising the additional steps of:
   A. determining whether the number in said means for indicating is smaller than the number of the table location addressed;
   B. using for said waiting period the period of time indicated by the table location addressed if said number in said means for indicating is smaller; and
   C. using for said waiting period the period of time indicated by the table location which corresponds in number to the number in said means for indicating if said number in said means for indicating is not smaller.

6. A method as defined in claim 5 further comprising the step of using the period of a specified velocity for said waiting period if said period of said specified velocity is greater than the one of said periods of time determined for use.

7. A method as defined in claim 1 further comprising the step of using the period of a specified velocity for said waiting period if said period of said specified velocity is greater than the period of time indicated by the table location addressed.

8. A method as defined in claim 1 wherein said step of changing the addressed location increments by one location said addressed location each time said motor is directed to step.

9. A method as defined in claim 1 wherein said table includes in said plurality of numbered locations decreasing time periods as the number of said location increases.

10. A method as defined in claim 9 wherein the addressed location of said table increases in number as said motor is directed to accelerate and wherein said number of said means for indicating decreases as said motor is directed to decelerate.

11. In a system comprising a data processor having a memory and a stepping motor coupled for control by said processor, a method comprising the steps of:
   A. indicating the number of times said motor is to be directed to step during a specified movement;
   B. indicating in a table having a plurality of numbered locations, said table stored in said memory, selected periods of time between the directing of steps of said motor to achieve a selected rate of change of said motor's velocity;
   C. changing the value of said number indicative of the number of times said motor is to be directed to step each time said motor is directed to step;
   D. changing the addressed location of said table each time said motor is directed to step;
   E. determining whether said number is smaller than the number of said location addressed;
   F. directing the stepping of said motor;
   G. generating an interrupt after waiting a period of time corresponding to the location addressed prior to the step of directing the stepping of said motor if said number is not smaller; and
   H. generating an interrupt after waiting a period of time corresponding to the location whose number corresponds to said number indicative of the number of times said motor is to be directed to step if said number is smaller.

12. A method as defined in claim 11 comprising the added step of causing said interrupt to repeat said steps of changing, determining, directing and generating.

13. A method for directing the stepping of a stepping motor $n$ steps, said motor being capable of accelerating from a first velocity to a second velocity in $p$ steps, where $p$ is less than $n$, said method comprising the steps of:

A. indicating by means having $p$ positions, a $p$ number of $n$ steps;
B. indicating by memory storage means having $p$ locations the time required between each $p$ step in order to achieve the required acceleration between said first and second velocities;
C. decrementing said $p$ number by one each time said motor is directed to step;
D. incrementing said $p$ number by one a total of $n$ minus $p$ times each time said motor is directed to step;
E. incrementing by one of the $p$ location addressed each time said motor is directed to step;
F. determining whether said decremented and incremented $p$ number is less than one of said $p$ locations addressed;
G. directing the stepping of said motor;
H. repeating said step of directing the stepping of said motor after waiting a period of time indicated by the one of said $p$ locations addressed prior to the directing of the stepping of said motor if said incremented and decremented $p$ number is less; and
I. repeating said steps of directing the stepping of said motor after waiting a period of time indicated by the one of said $p$ locations corresponding in number to the incremented and decremented $p$ number if said incremented and decremented $p$ number is not less.

14. A method for controlling the movement of a stepping motor, said method comprising the steps of:
A. decrementing a means for indicating the number of times said motor remains to be stepped for a specified movement each time said motor is directed to step;
B. incrementing an addressed index for indicating the time period between steps of said motor each time said motor is directed to step, said index stored in a memory storage means;
C. comparing the number of said number of times said motor remains to be stepped with the number of said addressed index for indicating;
D. directing the stepping of said motor;
E. repeating said step of directing the stepping of said motor after waiting a time period indicated by said addressed index for indicating if said number of said number of times is greater than said number of said addressed index; and
F. repeating said step of directing the stepping of said motor after waiting a time period indicated by said index corresponding in number to the number of said number of times said motor remains to be stepped if said number of said number of times is less than said number of said addressed index.

15. In a system comprising a digital computer, a stepping motor, means for coupling said motor and said computer, wherein said computer comprises means for indicating the number of times said motor is to be directed to step during a specified movement and a table stored in said computer, said table having a plurality of numbered locations for indicating selected periods of time between steps of said motor to achieve a selected rate of change of said motor's velocity, apparatus comprising:

A. means for changing the number of said means for indicating each time said motor is directed to step, said number corresponding to the number of times said motor is to be directed to step;
B. means for changing the addressed location of said table each time said motor is directed to step;
C. means for directing the stepping of said motor; and
D. means for repeating the directing of the stepping of said motor by said means for directing the stepping after waiting a period of time indicated by the table location addressed.

16. Apparatus as defined in claim 15 wherein said period of time is indicated by the table location addressed prior to directing the stepping of said motor.

17. Apparatus as defined in claim 15 further comprising:
A. means for determining whether said motor is to be accelerated; and
B. means for using said waiting period the period of time indicated by the table location addressed prior to directing the stepping of said motor if said motor is to be accelerated.

18. Apparatus as defined in claim 15 further comprising:
A. means for determining whether said motor is to be decelerated; and
B. means for using said waiting period the period of time indicated by the table location which corresponds in number to the number in said means for indicating if said motor is to be decreased.

19. Apparatus as defined in claim 15 further comprising:
A. means for determining whether the number in said means for indicating is smaller than the number of the table location addressed;
E. means for using for said waiting period the period of time indicated by the table location addressed if said number in said means for indicating is smaller; and
C. means for using said waiting period the period of time indicated by the table location which corresponds in number to the number of said means for indicating if said number in said means for indicating is not smaller.

20. Apparatus as defined in claim 19 further comprising means for using the period of a specified velocity for said waiting period if said period of said specified velocity is greater than the one of said periods of time determined for use.

21. Apparatus as defined in claim 15 further comprising means for using the period of a specified velocity for said waiting period if said period of said specified velocity is greater than the period of time indicated by the table location addressed.

22. Apparatus as defined in claim 15 wherein said means for changing the addressed location includes means for incrementing by one location said addressed location each time said motor is directed to step.

23. Apparatus as defined in claim 15 wherein said table includes in said plurality of numbered locations decreasing time periods as the number of said locations increases.

24. Apparatus as defined in claim 23 wherein the addressed location of said table increases in number as said motor is directed to accelerate and wherein said number of said means for indicating decreases as said motor is directed to decelerate.

25. In a system comprising a data processor having a memory and a stepping motor coupled for control by said processor, apparatus comprising:
A. means for indicating the number of times said motor is to be directed to step during a specified movement;

B. table means, having a plurality of numbered locations, said table stored in said memory, for indicating selected periods of time between the directing of steps of said motor to achived a selected rate of change of said motor's velocity;

C. first means for changing the value of said number indicative of the number of times said motor is to be directed to step each time said motor is directed to step;

D. second means for changing the addressed location of said table each time said motor is directed to step;

E. means for determining whether said number is smaller than the number of said locations addressed;

F. means for directing the stepping of said motor;

G. first means for generating an interrupt after waiting a period of time corresponding to the location addressed prior to the step of directing the the stepping of said motor if said number is not smaller; and H. second means for generating an interrupt after waiting a period of time corresponding to the location whose number corresponds to said number indicative of the number of times said motor is to be directed to step if said number is smaller.

26. Apparatus as defined in claim 25 further comprising means for causing said interrupt to repeat the operation provided by said second means for changing, said means for determining, said means for directing, and said first means for generating.

27. Apparatus for directing the stepping of a stepping motor $n$ steps, said motor being capable of accelerating from a first velocity to a second velocity in $p$ steps, where $p$ is less than $n$, said apparatus comprising:

A. means for indicating, said means having $p$ positions, a $p$ number of $n$ steps;

B. memory storage means for indicating, said means having $p$ locations, the time required between each $p$ step in order to achieve the required acceleration between said first and second velocities;

C. means for decrementing said $p$ number by one each time said motor is directed to step;

D. means for incrementing said $p$ number by one a total of $n$ minus $p$ times each time said motor is directed to step;

E. means for incrementing by one the $p$ location addressed each time said motor is directed to step;

F. means for determining whether said decremented and incremented $p$ number is less than the one of said $p$ locations addressed;

G. means for directing the stepping of said motor;

H. means for repeating the directing of the stepping of said motor after waiting a period of time indicated by the one of said $p$ locations addressed prior to the directing of the stepping of said motor if said incremented and decremented $p$ number is less; and I. means for repeating the directing of the stepping of said motor after waiting a period of time indicated by the one of said $p$ locations corresponding in number to the incremented and decremented $p$ number if said incremented and decremented $p$ number is not less.

* * * * *

UNITED STATES PATENT OFFICE
CERTIFICATE OF CORRECTION

Patent No. 3,813,592          Dated May 28, 1974

Inventor(s) Arlen W. Ryberg

It is certified that error appears in the above-identified patent and that said Letters Patent are hereby corrected as shown below:

Column 18, line 33, change "E" to --B--.

Column 19, line 6, change "achieved" to --achieve--.

Signed and sealed this 22nd day of October 1974.

(SEAL)
Attest:

McCOY M. GIBSON JR.
Attesting Officer

C. MARSHALL DANN
Commissioner of Patents